United States Patent [19]

Kokubo et al.

[11] 4,023,826
[45] May 17, 1977

[54] TONGUE PLATE SLIDABLY FITTED ON SAFETY SEAT BELT IN MOTOR VEHICLE

[75] Inventors: Yukio Kokubo; Mitsuo Inukai, both of Aichi, Japan

[73] Assignee: Kabushiki Kaisha Tokai Rika Denki Seisakusho, Aichi, Japan

[22] Filed: Sept. 18, 1975

[21] Appl. No.: 614,518

[30] Foreign Application Priority Data

Sept. 27, 1974 Japan ............... 49-117579[U]

[52] U.S. Cl. ............... 280/747; 24/163 R; 297/389
[51] Int. Cl.² ............... A62B 35/00
[58] Field of Search ........... 280/747, 744; 297/389; 24/163 FC, 163 R, 200; 180/82 C

[56] References Cited

UNITED STATES PATENTS

| | | | |
|---|---|---|---|
| 2,066,914 | 1/1937 | Staples | 24/163 FC |
| 2,551,165 | 5/1951 | Rochat | 24/163 R |
| 3,876,249 | 4/1975 | Nilsson | 297/389 |
| 3,929,351 | 12/1975 | Fricko | 297/389 X |

Primary Examiner—Joseph F. Peters, Jr.
Assistant Examiner—Michael J. Forman

[57] ABSTRACT

A tongue plate slidably fitted on a safety seat belt which comprises a continuous webbing which consists of a lap belt and a shoulder belt. A projection or a plurality of projections are provided in a slotted opening formed in the tongue plate, which opening provides for the passage of webbing therethrough whereby abrasion or frictional resistance of the lap belt is to be reduced when the lap belt is moved only in the direction of the shoulder belt. Suitable slack of the shoulder belt can be achieved by making the slack of the lap belt considerably smaller than that of the shoulder belt by means of said reduced frictional resistance of the lap belt.

6 Claims, 3 Drawing Figures

TONGUE PLATE SLIDABLY FITTED ON SAFETY SEAT BELT IN MOTOR VEHICLE

BACKGROUND OF THE INVENTION

1. Field of the Invention

The present invention relates to a tongue plate slidably fitted on a safety seat belt for preventing a seat occupant of the motor vehicle from being thrown out of his seat upon the occurance of an accident or collision, and particularly to such a tongue plate for the safety seat belt which comprises a continuous webbing which consists of a lap belt and a shoulder belt.

2. Description of the Prior Art

In recent years for restraining movement of a seat occupant of a motor vehicle, there has been generally used a safety seat belt comprising a continuous webbing including a lap belt and a shoulder belt.

In the tongue plate applicable for use with such a safety seat belt of the foregoing type, there is provided an opening for locking engagement with a buckle on one end thereof and a slotted opening providing for the passage of the continuous webbing therethrough on the other end thereof. In the slotted opening providing for the passage of this webbing, there has been defined some frictional resistance to the passage of this webbing to reduce the wind-up force of a retractor applied to the webbing on opposite sides of the retractor through the slotted opening.

On the other hand, as in the case of such a tongue plate, slack of the shoulder belt has been usually made equal to that of the lap belt because frictional resistance corresponding to movement of the tongue plate in the direction of the shoulder belt is equivalent to that corresponding to movement of the tongue plate in the direction of the lap belt. This has caused unnecessary slack of the lap belt portion, and also helped to restrain movement of the shoulder belt portion needlessly. Furthermore, since frictional resistance of such a tongue plate becomes large, a strong force has to be applied to the tongue plate in view of movement of the seat occupant when setting the safety seat belt. This causes the tongue plate in locking engagement with the buckle to produce swinging movement centered on the buckle anchor. Therefore, there have been some disadvantages that the tongue plate provides pressure upon the seat occupant's side and chest or the like due to such a swinging movement thereof.

SUMMARY OF THE INVENTION

Accordingly, a principal object of the present invention is to provide a tongue plate slidably fitted on a safety seat belt for fully restraining movement of the seat occupant of the motor vehicle in an accident or collision by removing unnecessary slack of a lap belt portion of the safety seat belt through a simple construction thereof.

A further object of the present invention is to provide a tongue plate for a safety seat belt having an improved setting comfort thereof in such a manner wherein a shoulder belt portion of webbing can be always easily made more movable than a lap belt portion of webbing to increase the degree of unrestraint of the seat occupant in the motor vehicle in the case of setting thereof.

Still another object of the present invention is to provide a tongue plate for a safety seat belt which removes unnecessary pressure upon the seat occupant in the case of setting thereof by suitably reducing a force applied to a slotted opening formed in the tongue plate so as to decrease swining movement of a buckle.

In accordance with the present invention, a tongue plate for a safety seat belt has an engaging portion for locking engagement with a buckle on one end thereof, and a slotted opening providing for the passage of webbing on the other end thereof, wherein resilient projections for retaining the webbing are formed in the end portion of the slotted opening and extend in the direction of the thickness of the webbing whereby frictional resistance in the retracting direction of webbing passing through the slotted opening becomes greater than that in the other protracting direction.

BRIEF DESCRIPTION OF THE DRAWING

A better understanding of the preferred embodiment of a tongue plate for a safety seat belt according to the present invention will be obtained from the following more detailed description taken in connection with the drawing in which.

DETAILED DESCRIPTION OF THE PREFERRED EMBODIMENT

Figure 1:
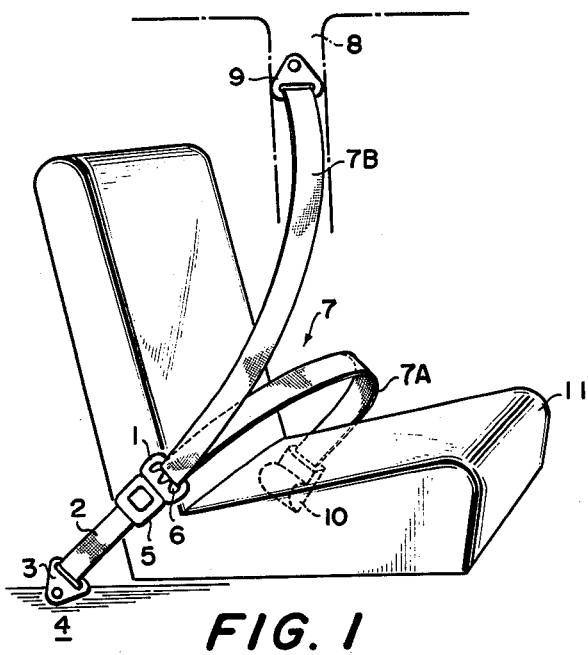
FIG. 1 is a perspective view showing an embodiment of a safety seat belt to which is attached a tongue plate according to the present invention.
Figure 2:
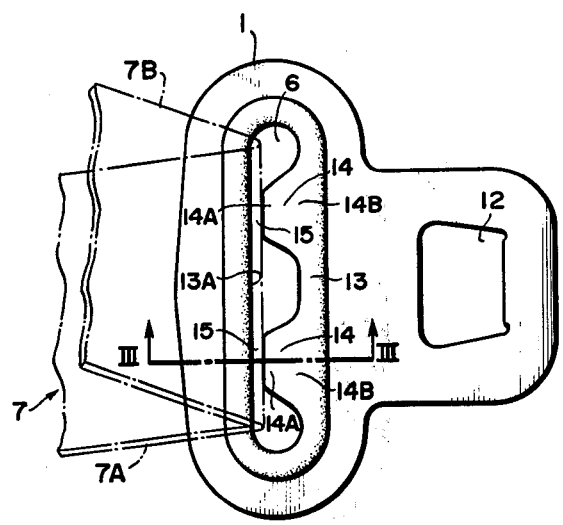
FIG. 2 is a plan view showing the tongue plate according to the present invention.

In FIGS. 1 and 2, there is illustrated a preferred embodiment of a safety seat belt to which is attached a tongue plate according to the present invention.

A tongue plate 1 is engaged at one end in locking engagement with a buckle 5 which is secured to a floor 4 through a strap 2 and an anchor 3 and the other end thereof permits the middle portion of a webbing 7 to be inserted through a slotted opening 6. One end of this webbing 7 is hooked to a shoulder anchor 9 mounted on a window frame 8 of a motor vehicle, and the other end thereof is retracted and energized by the retracting shaft of a retractor 10 mounted on the floor 4. Webbing between the tongue plate 1 and the retractor 10 serves as a lap belt 7A and the same between the tongue plate 1 and the shoulder anchor 9 serves as a shoulder belt 7B, which webbing constitutes a three-way belt in connection with a strap 2.

In the drawings, reference numeral 11 designates a seat for a seat occupant in the motor vehicle.

Figure 3:
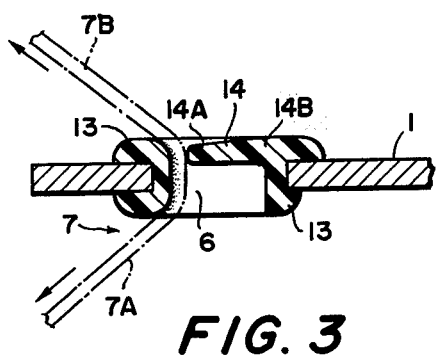
FIG. 3 is a cross-sectional view taken along the line III—III of FIG. 2.

In FIGS. 2 and 3, a thin plate shaped tongue plate 1 is provided at one end with an opening 12 for locking engagement with the buckle 5, the other end of the tongue plate being provided with a slotted opening 6 providing for the reception of continuous webbing 7. The inner surface of the slotted opening is covered by resin molding 13 in a way to prevent wear of webbing by reducing frictional resistance between the inner surface thereof and the webbing 7 passing therethrough.

Referring now to FIG. 3, the slotted opening 6 permits the continuous webbing 7 to be extended therethrough, the webbing 7 being continuous and acting as a shoulder belt 7B upwardly and a lap belt 7A downwardly.

The slotted opening 6 is provided with a plurality of projections 14 of resilient material integrally molded with the resin molding 13 which projections are protruded in the direction of the thickness of webbing. The projections are placed on one end of the shoulder belt side of the slotted opening 6, i.e., on the upper portion of the tongue plate in FIG. 3 showing a cross-sectional view of the tongue plate. Thus, the webbing 7 can be made retainable between the resilient projections 14 and the resin molding surface 13A of the slotted opening 6. A space 15 substantially equivalent to the thickness of webbing 7 or somewhat less than that of webbing 7 is defined between the end portions 14A of projections 14 and the resin molding surface 13A on opposite sides of the portions in which the base portions 14B of projections 14 are continuously disposed. In addition there is provided a pair of projections 14 in the longitudinal orientation of slotted opening 6 as shown in FIG. 2.

Since this embodiment is constructed as described above, as best seen in FIG. 3 when a tensile force is applied to the continuous webbing in the direction of shoulder belt 7B, the plurality of projections 14 are displaced upwardly to extend the width of space 15 due to the displacement of the end portion 14A thereof whereby frictional resistance of the webbing is reduced. On the contrary, when the tensile force is applied to the webbing in the direction of lap belt 7A, the plurality of projections are displaced downwardly as seen in FIG. 3 whereby the width of space 15 is not extended. Therefore, frictional resistance of webbing 7 is not decreased and it becomes too hard for the webbing to be moved.

Further, in the above embodiment the projections have been manufactured integrally with the resin molding. However, the projections can be separate from the tongue plate 1 and can be attached to the tongue plate and the projections can be manufactured integrally with the tongue plate 1.

Furthermore, the projections can be fabricated from not only metal and resin but also other flexible materials.

In the above embodiment it has been illustrated that a pair of projections are provided in the slotted opening 6, but a single projection or a plurality of projections can be employed.

Having described the preferred embodiment, the tongue plate for the safety seat belt is provided with an engaging portion for locking engagement with the buckle device on one end thereof and the slotted opening 6 providing for the reception of the webbing on the other end thereof. In accordance with the present invention, the tongue plate has a single or a plurality of projections which are protruded in the direction of the thickness of the webbing for retaining the webbing in the inner end surface of the slotted opening for the passage way of the webbing. Therefore, there is provided the tongue plate slidably fitted on the safety belt which is adapted to protect a seat occupant from being flung out of the seat through full restraint of the seat occupant during an emergency condition of the motor vehicle.

Furthermore, the expanded effect can be obtained wherein an improved setting comfort of the safety seat belt is achieved by increasing the degree of unrestraint on the lap or shoulder belt portions and by removing unnecessary pressure with respect to the seat occupant associated with the swinging movement of the buckle device.

Although the present invention is illustrated and described with reference to a preferred embodiment thereof, it is to be expressly understood that it is no way limited to the disclosure of such a preferred embodiment, but is capable of numerous modifications within the scope of the appended claims.

What we claim is:

1. A tongue plate for a safety belt means having an engaging portion for locking engagement with a buckle device on one end thereof and a slotted opening providing for the passage of a continuous webbing on the other end thereof, characterized in that said slotted opening is provided with at least one resilient projection offset with respect to the middle of the depth of said opening formed along one longitudinal enlongated edge of the tongue plate at the upper portion thereof, said projections extending inwardly from said upper portion in the direction of the thickness of the webbing and defining a space between said projections and the opposite longitudinal elongated edge of said slotted opening having a width not greater than the thickness of said webbing to retain said webbing between said projections and opposite edge of said slotted opening.

2. A tongue plate for a safety seat belt means according to claim 1, characterized in that said projections are defined integrally with said tongue plate.

3. A tongue plate for a safety seat belt means according to claim 1, characterized in that said projections are molded integrally with resin molding for protecting the webbing.

4. A tongue plate for a safety seat belt means according to claim 1, characterized in that said projections formed separately from said tongue plate are attached to said tongue plate.

5. A tongue plate for a safety seat belt means according to claim 1, characterized in that a plurality of projections are disposed in the longitudinal direction of said slotted opening.

6. A tongue plate according to claim 1, characterized in that said space has a width somewhat smaller than the thickness of the webbing.

* * * * *